United States Patent
Ueda

(10) Patent No.: US 11,869,759 B2
(45) Date of Patent: Jan. 9, 2024

(54) MASS SPECTROMETER

(71) Applicant: SHIMADZU CORPORATION, Kyoto (JP)

(72) Inventor: Manabu Ueda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 423 days.

(21) Appl. No.: 17/056,483

(22) PCT Filed: May 31, 2018

(86) PCT No.: PCT/JP2018/021044
§ 371 (c)(1),
(2) Date: Nov. 18, 2020

(87) PCT Pub. No.: WO2019/229954
PCT Pub. Date: Dec. 5, 2019

(65) Prior Publication Data
US 2021/0217605 A1 Jul. 15, 2021

(51) Int. Cl.
H01J 49/42 (2006.01)
H01J 49/06 (2006.01)
G01N 27/62 (2021.01)

(52) U.S. Cl.
CPC ............ *H01J 49/426* (2013.01); *G01N 27/62* (2013.01); *H01J 49/063* (2013.01); *H01J 49/067* (2013.01)

(58) Field of Classification Search
CPC .............................. G01N 27/62; G01N 27/622
See application file for complete search history.

(56) References Cited

U.S. PATENT DOCUMENTS

| 2011/0036976 | A1 | 2/2011 | Mukaibatake | |
|---|---|---|---|---|
| 2014/0264007 | A1* | 9/2014 | Remes | H01J 49/0031 250/288 |
| 2016/0118235 | A1* | 4/2016 | Fujita | H01J 49/022 250/290 |

FOREIGN PATENT DOCUMENTS

| JP | 6004098 B2 | 10/2016 |
|---|---|---|
| WO | 2009/141847 A1 | 11/2009 |
| WO | 2014/181396 A1 | 11/2014 |

OTHER PUBLICATIONS

Written Opinion for PCT/JP2018/021044, dated Aug. 28, 2018.
International Search Report for PCT/JP2018/021044, dated Aug. 28, 2018.

* cited by examiner

Primary Examiner — David E Smith
(74) Attorney, Agent, or Firm — Sughrue Mion, PLLC

(57) ABSTRACT

After performing an analysis on a standard sample for a predetermined time, a plurality of ion optical elements such as an ion guide are sequentially selected one by one, and a direct-current voltage having a polarity different from that at the time of analysis is temporarily applied. Meanwhile, intensity data of ions having a specific m/z are continuously collected. After thus collecting the data, the ratio of the ion intensities before and after application of direct-current voltages having different polarities is calculated for each ion optical element, and it is determined whether or not the ratio is equal to or larger than a predetermined threshold value.

4 Claims, 4 Drawing Sheets

MASS SPECTROMETER

CROSS REFERENCE TO RELATED APPLICATIONS

This application is a National Stage of International Application No. PCT/JP2018/021044 filed May 31, 2018.

TECHNICAL FIELD

The present invention relates to a mass spectrometer and, more particularly, to a technique for improving maintainability of the mass spectrometer.

BACKGROUND ART

In a mass spectrometer, various ion optical elements such as an electrostatic lens, a radio-frequency ion guide, and a quadrupole mass filter are used in general. Such an ion optical element generates, by a voltage applied to the ion optical element, a direct-current electric field, a radio-frequency electric field or an electric field produced by superposing those fields, and controls the behavior of ions by the effect of such an electric field.

The ion optical element is contaminated by various factors with the use of the mass spectrometer. When an insulating layer is formed by contaminants or foreign substances attached on the surface of an ion optical element, the ions impinging on that portion are likely to cause electrification, or the "charge-up". Allowing too much of a charge-up leads to a disturbance of the electric field formed by the ion optical element, with the consequent incapability of a wanted control on ions. As a result, the number of ions reaching the ion detector decreases or becomes unstable, resulting in reduction in measurement accuracy and measurement sensitivity.

As a technique for preventing or reducing the charge-up of an ion optical element, the technique described in Patent Literature 1 is known. In the system described in the patent literature, the polarity of the direct-current voltage applied to the ion optical element is temporarily reversed so as to be opposite to the polarity at the time of analysis, during a waiting time between analyses, for example. Then, since the potential of the ion optical element becomes the same as that of the charge accumulated on the surface or the like, the charge can be dispersed by the electrostatic repulsive force.

Although the charge-up of the ion optical element can be temporarily eliminated by the method described above, too much contamination of the ion optical element sometimes causes even the method described above to fail to eliminate the charge-up sufficiently, resulting in difficulty in maintaining the performance of the system. In such a case, it is necessary to stop the vacuum exhaust of the system to return the inside of the casing to atmospheric pressure before taking out an ion optical element from the casing to clean the ion optical element. Since a mass spectrometer normally includes several ion optical elements, it takes a long time to take out and clean all the ion optical elements in the casing. There is also a risk during cleaning that the ion optical element is damaged or foreign substance is attached to the ion optical element. Therefore, it is desirable to take out and clean only the ion optical element with contamination having progressed, for which cleaning is truly needed.

Therefore, conventionally, the operator infers the ion optical element in which contamination has progressed on the basis of his/her own experience, or the operator infers the ion optical element in which contamination has progressed while observing the behavior of the ion intensity obtained for the voltage applied to each ion optical element, and by doing so the ion optical element to clean is narrowed down. However, the efficiency and accuracy of the operation by such a method largely depend on the experience and skill of the operator. Therefore, when an inexperienced or unskilled operator performs the work, there is a problem of taking time to specify the ion optical element that needs cleaning, and deterioration in the maintainability.

CITATION LIST

Patent Literature

Patent Literature 1: WO 2014/181396 A
Patent Literature 2: WO 2009/141847 A

SUMMARY OF INVENTION

Technical Problem

The present invention has been made to solve the above problem and an object of the present invention is to provide a mass spectrometer capable of accurately specifying an ion optical element in which contamination has progressed and improving maintainability without depending on the experience or skill of the operator.

Solution to Problem

The present invention made to solve the above problem is a mass spectrometer including a plurality of ion optical elements configured to transport ions or control the behavior of ions by an effect of an electric field formed by an applied voltage, the mass spectrometer including:
  a) a controller configured to perform an analysis operation for a predetermined time for a predetermined sample, and then to control each unit so as to cause all or two or more of the plurality of ion optical elements to sequentially perform an operation of eliminating charge-up in the ion optical elements;
  b) a contaminant estimation unit configured to estimate a degree of contaminant of each ion optical element on a basis of a change in ion intensity when an operation of eliminating charge-up in each ion optical element is performed under control of the controller; and
  c) a display processor configured to display a contaminant estimation result for each ion optical element by the contaminant estimation unit.

The "ion optical element" in the present invention includes any element which can focus, disperse, accelerate or decelerate ions by the effect of a direct-current electric field, a radio-frequency electric field or an electric field produced by superposing those fields, and perform such an operation on ions having a specific mass-to-charge ratio or included in a specific mass-to-charge-ratio range. Specific examples of the ion optical element include: elements which are commonly called the "electrostatic lens" or "ion guides"; a device having an ion-passing hole, such as a skimmer, sampling cone, or aperture electrode; as well as a quadrupole mass filter and a pre-quadrupole mass filter and a post-quadrupole mass filter disposed at a preceding stage and a subsequent stage of the quadrupole mass filter.

The mass spectrometer according to the present invention performs a process for checking the state of contaminant on all or two or more ion optical elements included in the mass spectrometer at an appropriate time. That is, the controller performs an analysis operation only for a predetermined time for a predetermined sample such as a standard sample, and then controls each unit so as to cause the plurality of ion optical elements to sequentially perform an operation of eliminating charge-up in the ion optical elements. In the analysis operation for the predetermined time, each ion optical element is operated in the same manner as that in a normal analysis operation, but the ion intensity may not necessarily be detected by the detector.

When any of the ion optical elements is contaminated, the charge up of the contaminated point progresses during the analysis operation for the predetermined time. Therefore, without charge-up, it becomes gradually difficult for ions reaching the detector to pass through, and the time when the analysis operation for the predetermined time is over, the ion intensity obtained by the detector is decreased compared with that at the initial analysis operation. In that state, if the operation of eliminating the charge-up is performed for the ion optical element being charged up, the charge-up is temporarily eliminated, and the ion intensity obtained by the detector is increased. On the other hand, even if the operation of eliminating the charge-up is performed for the ion optical element not charged up, the ion intensity obtained by the detector does not change. Therefore, the contaminant estimation unit determines, for example, the presence or absence of contaminant on the basis of a change in the ion intensity when an operation of eliminating charge-up is performed for each ion optical element.

Then, the display processor displays the contaminant estimation result of each ion optical element. Thus, the operator can know whether or not there is a contaminated ion optical element or which ion optical element is contaminated.

In one aspect of the present invention, an operation of eliminating charge-up of an ion optical element by the controller can be an operation of temporarily applying a direct-current voltage having a different polarity from that of the direct-current voltage applied to the ion optical element at a time when an analysis operation is performed or a direct-current voltage having a same polarity as a polarity of an ion to be analyzed.

When the polarity of the direct-current voltage applied to an ion optical element is temporarily made different from that at the time of the analysis operation, the polarity of the voltage is the same as the polarity of the charge accumulated in the contaminated point of the ion optical element. Therefore, the charge accumulated in the contaminated point is dispersed by the electrostatic repulsive force, and the charge-up is temporarily eliminated or reduced. This makes it possible to determine whether or not the ion optical element is contaminated.

In another aspect of the present invention, an operation of eliminating charge-up of an ion optical element by the controller can be an operation of generating ions having a polarity different from a polarity at a time when an analysis operation is performed in an ion source, and driving each ion optical element so that the ions pass through the ion optical element and an ion optical element positioned on an upstream side of an ion stream with respect to the ion optical element.

The charge accumulated at the contaminated point of the ion optical element during the analysis operation described above has the same polarity as that of the ion. Therefore, when ions generated by the ion source and having a polarity different from that at the time when the analysis operation is performed reach the ion optical element in which charges are accumulated, the polarity of the ions is opposite to the polarity of the accumulated charges, and hence the accumulated charges are neutralized. When the ion optical element is driven so that the ions pass through, the polarity of the direct-current voltage applied to the ion optical element temporarily becomes different from the polarity at the time of the analysis operation, and hence the previously described charge-dispersing effect by the electrostatic repulsive force also works. As a result, the charge-up is temporarily eliminated or reduced. This makes it possible to determine whether or not the ion optical element is contaminated.

The present invention can preferably have a configuration in which the contaminant estimation unit determines presence or absence of contaminant of an ion optical element by comparing, with a threshold value, a difference or ratio between the ion intensities detected before and after an operation of eliminating the charge-up.

When the charge-up is temporarily eliminated as described above, the ion intensity detected by the detector increases. Therefore, if the difference or ratio between the ion intensities detected before (preferably immediately before) and after the operation of eliminating the charge-up is equal to or larger than a predetermined threshold value, it can be estimated that the charge-up of the ion optical element has been eliminated, i.e., the ion optical element is so contaminated to that it is charged up. In this configuration, by appropriately setting the threshold value for determination, it is possible to estimate charge-up in a plurality of ion optical elements even if one is occurring.

In the present invention, the contaminant estimation unit may be configured to determine presence or absence of contaminant of an ion optical element on a basis of the ion intensity detected at an early analysis operation for the predetermined time and an ion intensity detected after an operation of eliminating the charge-up is performed.

In a case where the number of charged up ion optical elements is only one, when the charge-up of the ion optical element is eliminated, the ion intensity returns to a state close to the ion intensity detected at an early analysis operation for a predetermined time, and hence the presence or absence of contaminant of the ion optical element can be estimated by determining whether or not the ion intensity has returned to such a state.

If the ion intensity obtained by analyzing a predetermined sample in a state without charge-up is stored as a reference value, the presence or absence of contaminant of the ion optical element can be determined by comparison with the reference value. That is, in the present invention, the contaminant estimation unit can also be configured to determine presence or absence of contaminant of an ion optical element on a basis of an ion intensity detected after an operation of eliminating the charge-up is performed and the previously stored reference value.

The ion intensity may be an intensity of an ion having a specific mass-to-charge ratio, i.e., an ion intensity measured by selected ion monitoring (SIM) measurement or multiple reaction monitoring (MRM) measurement, or the total ion current signal in a scan measurement. In general, low-mass ions are more susceptible to charge-up than high-mass ions, and it is hence preferable to target low-mass ions when SIM measurement or MRM measurement is performed.

Advantageous Effects of Invention

According to the mass spectrometer according to the present invention, it is possible to automatically grasp and inform the operator of an ion optical element in which contaminant has progressed among a plurality of ion optical elements without depending on the experience or skill of the operator. Thus, the operator only has to take out and clean only an ion optical element in which contaminant has progressed from the casing, and this eliminates the need for an unnecessary operation and improves maintainability.

DESCRIPTION OF EMBODIMENTS

First Embodiment

A quadrupole mass spectrometer according to a first embodiment of the present invention is hereinafter described with reference to the attached drawings.

Figure 1:
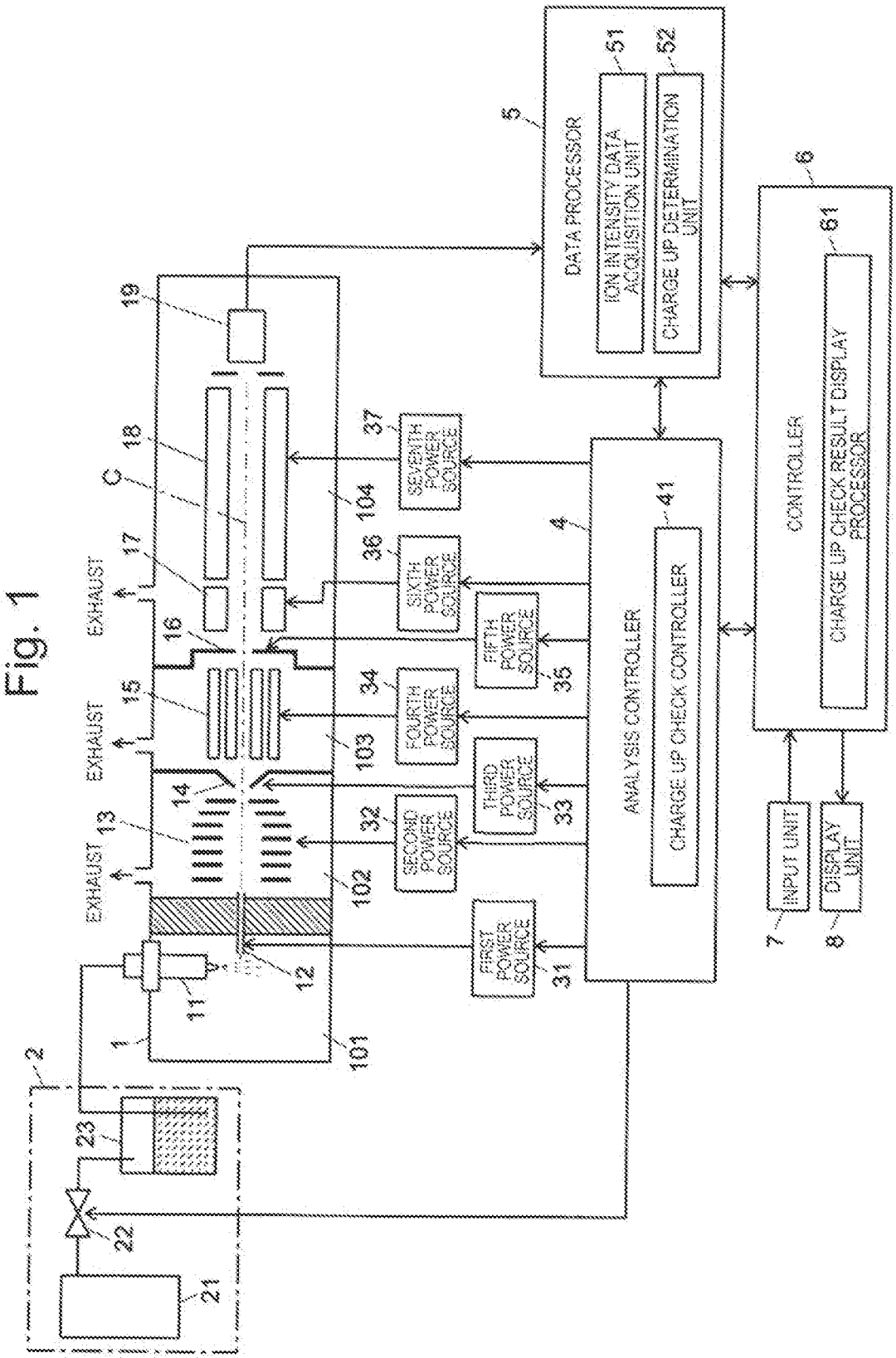
FIG. 1 is a schematic configuration diagram showing a quadrupole mass spectrometer according to a first embodiment of the present invention.

FIG. 1 is a configuration diagram showing the main components of the quadrupole mass spectrometer of the present embodiment.

The quadrupole mass spectrometer of the present embodiment has a casing 1, which contains an ionization chamber 101 for ionizing the compounds in a sample under generally atmospheric pressure and an chamber 104 in which a high vacuum atmosphere is maintained for performing a mass spectrometry of ions and detecting those ions. Additionally, a first intermediate vacuum chamber 102 and a second intermediate vacuum chamber 103, with a stepwise increase in the degree of vacuum, are provided between the ionization chamber 101 and the analysis chamber 104. The ionization chamber 101 and the first intermediate vacuum chamber 102 communicate with each other through a heated capillary 12 which is heated to an appropriate temperature. The first intermediate vacuum chamber 102 and the second intermediate vacuum chamber 103 communicate with each other through a small ion-passing hole formed at the apex of a substantially conical skimmer 14. The second intermediate vacuum chamber 103 and the analysis chamber 104 communicate with each other through a small ion-passing hole formed in an aperture electrode 16.

The ionization chamber 101 contains an electrospray ionization (ESI) probe 11 for ionizing the compounds in a liquid sample by electrostatic atomization of the sample. Each of the first and second intermediate vacuum chambers 102 and 103 contains an ion lens 13 and a multiple ion guide 15 for transporting ions while focusing them by the effect of a radio-frequency electric field. The analysis chamber 104 contains a pre-quadrupole mass filter 17, a main quadrupole mass filter 18 and an ion detector 19 arranged along the ion beam axis C.

Here, the ion lens 13 includes a plurality of (e.g. four) virtual rod electrodes arranged around the ion beam axis C, with each virtual rod electrode including a plurality of electrode elements arrayed at predetermined intervals along the ion beam axis C. The multipole ion guide 15 is composed of a plurality of (e.g. eight) rod electrodes arranged around the ion beam axis C and extending parallel to the ion beam axis C. As for the pre-quadrupole mass filter 17 and the main quadrupole mass filter 18, each of them is composed of four rod electrodes arranged around the ion beam axis C and extending parallel to the ion beam axis C.

The heated capillary 12, ion lens 13, skimmer 14, multipole ion guide 15, aperture electrode 16, pre-quadrupole mass filter 17 and main quadrupole mass filter 18 arranged along the ion beam axis C are supplied with either a direct-current voltage or a composite voltage of radio-frequency voltage and direct-current voltage from first to seventh power sources 31 to 37, respectively. Each of these devices is used for focusing or dispersing ions, or for accelerating or decelerating ions, by the effect of an electric field (a radio-frequency or direct-current electric field). That is to say, those devices are used for transporting ions while controlling their motion. Each of them corresponds to the ion optical element in the present invention.

The operations of the power sources 31 to 37 are each controlled by an analysis controller 4. The analysis controller 4 has a charge-up check controller 41 as the functional block in charge of the operations which are characteristic of the system of the present embodiment. A data processor 5 receives detection signals obtained with the ion detector 19 and performs various kinds of processing, such as the creation of a mass spectrum, mass chromatogram, total ion chromatogram or other forms of information, a qualitative determination of an unknown compound, or a quantitative determination of a target compound. The data processor 5 has an ion intensity data acquisition unit 51 and a charge-up determination unit 52 as the functional blocks in charge of the operations which are characteristic of the system of the present embodiment. A controller 6 is responsible for controlling the system at higher levels than the analysis controller 4 as well as providing a user interface through an input unit 7 and a display unit 8. The controller 6 has a charge-up check result display processor 61 as the functional block in charge of the operations which are characteristic of the system of the present embodiment. In general, the controller 6, data processor 5 and analysis controller 4 can be configured on a personal computer provided as the hardware resource, with their respective functions realized by executing a dedicated controlling and processing software program previously installed on that computer.

A sample supply unit 2 shown in FIG. 1 includes a nitrogen gas supply source 21, a valve 22, and a sample reservoir 23. The sample supply unit 2 adopts the gas pressurized liquid feeding method disclosed in Patent Literature 2 and the like. The sample supply unit 2 is normally used when the charge-up check described later is performed, and when LC/MS analysis of the target sample is performed, a sample liquid exiting from the column of a liquid chromatograph (LC) is connected to the ESI probe 11 in place of the sample supply unit 2.

A general analysis operation in the quadrupole mass spectrometer of the present embodiment will be briefly described.

For example, when a sample liquid exiting from the column of a LC (not shown) is introduced into the ESI probe 11, the sample liquid is given electric charges at the tip of the probe 11 and sprayed into the ionization chamber 101 in the form of fine charged droplets. Due to the contact with the surrounding air, the charged droplets are broken into smaller sizes, and simultaneously, the solvent in the droplets is vaporized. During this process, the sample components in the droplets are given electric charges and turn into ions.

Due to the pressure difference between the two ends of the heated capillary 12, a gas stream which flows from the ionization chamber 101 into the first intermediate vacuum chamber 102 is formed. Therefore, the generated ions are drawn into the heated capillary 12 and sent into the first intermediate vacuum chamber 102. Ions derived from the sample are focused by the ion lens 13 and sent into the second intermediate vacuum chamber 103 through the ion-passing hole at the apex of the skimmer 14. Then, the ions derived from the sample are focused by the multipole ion guide 15 and sent into the analysis chamber 104 through the ion-passing hole formed in the aperture electrode 16.

In the analysis chamber 104, the ions derived from the sample are introduced through the pre-quadrupole mass filter 17 into the main quadrupole mass filter 18. Since a voltage which consists of a radio-frequency voltage superposed on a direct-current voltage is applied from the seventh power source 37 to the rod electrodes of the main quadrupole mass filter 18, only an ion having a specific mass-to-charge ratio corresponding to that voltage is allowed to pass through the main quadrupole mass filter 18 and reach the ion detector 19. The ion detector 19 generates an ion-intensity signal corresponding to the number of ions it has received. The data processor 5 processes the detection data obtained by digitizing the ion-intensity signal.

In the analysis described above, since neutral particles, such as charged droplets and component molecules from which the solvent is not sufficiently vaporized, attach to the heated capillary 12, the ion lens 13, the skimmer 14 and the like, the contaminant gradually progresses. When such contamination forms an insulating layer and ions impinge on the layer, the charge-up occurs due to the charge of the ions. The system of the present embodiment has a charge-up check function of checking the presence or absence of such charge-up and presenting, to the user, a point (ion optical element) where the charge-up occurs. Next, the charge-up check process will be described in detail.

Figure 2:
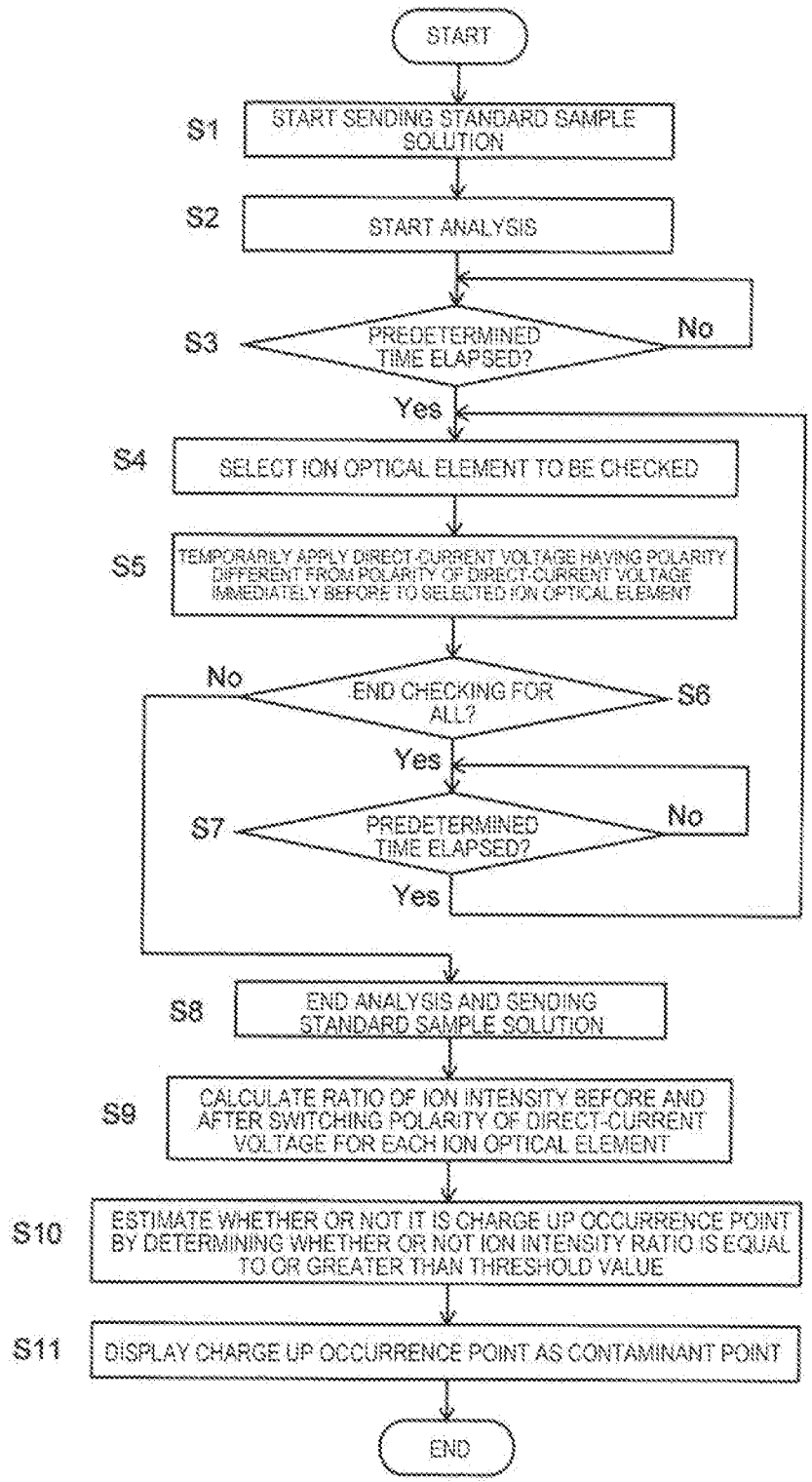
FIG. 2 is a flowchart of a charge-up check process in the quadrupole mass spectrometer of the first embodiment.
Figure 3:
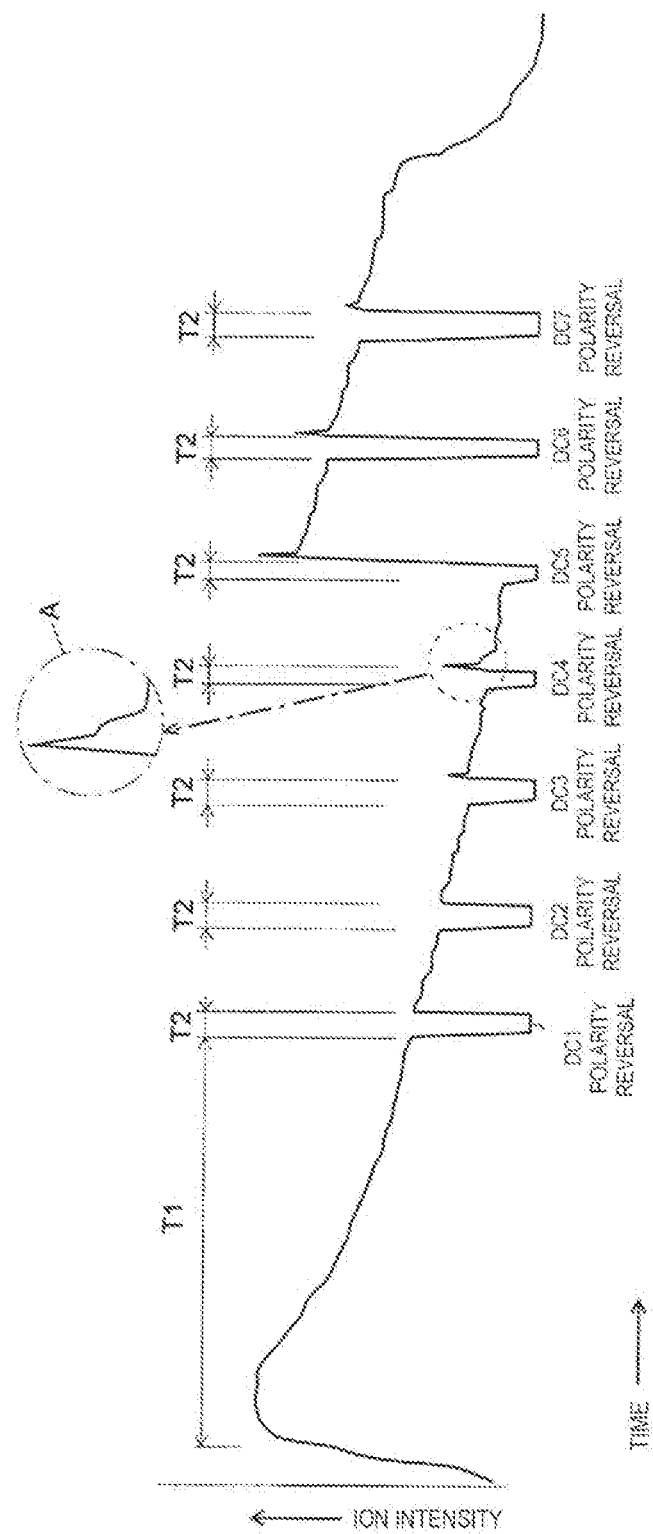
FIG. 3 is a waveform chart for explaining a determination method of charge-up in the quadrupole mass spectrometer of the first embodiment.

FIG. 2 is a flowchart of the charge-up check process, and FIG. 3 is an explanatory chart of the determination method of charge-up. In the system of the present embodiment, the operator can perform the charge-up check process by performing a predetermined operation on the input unit 7. The charge-up check process may be automatically performed at a predetermined timing. Specifically, the charge-up check process may be automatically performed after the system is started and sufficient vacuum exhaust is performed. Alternatively, the charge-up check process may be performed at the time of performing the auto-tuning in which the parameters of each unit are automatically adjusted.

Here, the charge-up of the seven ion optical elements of the heated capillary 12, ion lens 13, skimmer 14, multipole ion guide 15, aperture electrode 16, pre-quadrupole mass filter 17 and main quadrupole mass filter 18 is to be checked, but it is not always necessary to check all the charge-up, and hence the operator may be able to specify the ion optical element to be checked.

When the charge-up check process is started, the charge-up check controller 41 opens the valve 22 of the sample supply unit 2. Then, nitrogen gas is introduced into the upper space of the sample reservoir 23 from the nitrogen gas supply source 21, and the standard sample solution stored by the pressure of the nitrogen gas is supplied to the flow path toward the ESI probe 11 (Step S1). A polyethylene glycol (PEG) solution can be used as the standard sample solution.

After starting sample sending, the charge-up check controller 41 controls each part including the power sources 31 to 37 so as to repeat selected ion monitoring (SIM) measurement targeting a predetermined mass-to-charge ratio. According to this configuration, the analysis is started, and in the data processor 5, the ion intensity data acquisition unit 51 starts collecting the ion intensity data (Step S2). When a PEG solution is used as the standard sample solution, the SIM measurement target may be positive ions of m/z 168.1.

Elapse of a predetermined time from the analysis start time (determined to be Yes in step S3) is waited. It is preferable that the predetermined time is a length of time in which the sending of the standard sample from the sample supply unit 2 is sufficiently stable and the reduction of the ion intensity caused by the charge-up of the contaminated part when any of the ion optical elements is contaminated can be sufficiently observed. Specifically, this time is usually about 5 to 10 minutes.

When the predetermined time elapses in step S3, the charge-up check controller 41 selects one ion optical element to be checked (Step S4), and controls any of the power sources 31 to 37 so that the direct-current voltage applied to the ion optical element is a predetermined voltage having a polarity different from that immediately before for a predetermined time (Step S5). Here, the seven ion optical elements of the heated capillary 12, ion lens 13, skimmer 14, multipole ion guide 15, aperture electrode 16, pre-quadrupole mass filter 17 and main quadrupole mass filter 18 described above are to be checked one by one in that order. Therefore, in the flowchart shown in FIG. 2, when the processes of steps S4 and S5 are performed for the first time, the direct-current voltage applied from the first power source 31 to the heated capillary 12 is changed by a predetermined time.

Here, similarly to the method described in Patent Literature 1, the polarity of the direct-current voltage is reversed for the purpose of dispersing the accumulated charges to eliminate the charge-up by temporarily applying, to the ion optical element, the voltage having the same polarity as that of the charges accumulated in the contaminated point of the ion optical element. Therefore, it is preferable that the period of time for changing the applied direct-current voltage is an appropriate period of time in which the charge-up can be temporarily eliminated. Of course, the longer the period of time is, the more reliably the charge-up is eliminated, but too long time will cause the charge-up check process itself to take too much time. Therefore, in general, it is preferable to set the reversal time of the voltage polarity to about several seconds to ten seconds. The voltage value of the direct-current voltage (absolute value of voltage) to be temporarily changed needs to be a voltage value sufficient to be capable of temporarily eliminating the charge-up, and is usually preferably about 10 to 50 V.

After changing, by a predetermined time, the direct-current voltage applied to the ion optical element selected in step S4, the charge-up check controller 41 determines whether or not the process of step S5 has been performed for all the ion optical elements to be checked (Step S6), If any of the ion optical elements has not been subjected to the process of step S5, the processing returns to step S4 after waiting for a predetermined time (Step S7). When the processing returns from step S7 to step S4, the charge-up check controller 41 selects one of the remaining ion optical elements to be checked, excluding the ion optical element already selected. Therefore, here, every time the processing of steps S4 to S7 is repeated, the direct-current voltages applied to the heated capillary 12, ion lens 13, skimmer 14, multipole ion guide 15, aperture electrode 16, pre-quadrupole mass filter 17 and main quadrupole mass filter 18 are temporarily charged in order.

Then, after the direct-current voltage applied from the seventh power source 37 to the main quadrupole mass filter 18 is temporarily changed, it is determined No in step S6, and the processing proceeds to step S8, where the sending and analysis operations of the standard sample by the sample supply unit 2 ends.

By the analysis operation described above, the ion intensity data acquisition unit 51 continuously collects and stores the ion intensity data under the condition that the direct-current voltages applied to the heated capillary 12, ion lens 13, skimmer 14, multipole ion guide 15, aperture electrode 16, pre-quadrupole mass filter 17 and main quadrupole mass filter 18 are temporarily changed.

On the basis of the stored ion intensity data, the charge-up determination unit 52 specifies a charge up occurrence point, i.e., a contaminated point, as follows.

FIG. 3 is a measurement example of the ion intensity observed during the analysis operation in the charge-up check process. In FIG. 3, DC 1 to DC 7 indicate direct-current voltages applied to the ion optical elements from the first power source 31 to the seventh power source 37, respectively. A period of time T1 in FIG. 3 is a period of time during which the process of step S3 is repeated, and a high ion intensity is observed at the beginning of this period of time, but the ion intensity gradually decreases due to charge-up as time elapses. Thereafter, a direct-current voltage having a polarity reversed from that immediately before is temporarily applied in order from the heated capillary 12. In a period of time T2 during which this voltage is applied to a certain ion optical element, ions cannot pass through the ion optical element, and hence the ion intensity decreases to substantially zero. Then, when the direct-current voltage applied to the ion optical element is restored, the ion intensity also increases.

As described above, in the case where charge-up occurs in one ion optical element, if the polarity of the direct-current voltage applied to the ion optical element is reversed, at least some of the charges accumulated in the contaminated point of the ion optical element are dispersed, and the charge-up is eliminated or reduced. Therefore, in the case where the ion intensity has been reduced due to the charge-up, the ion intensity should be increased by eliminating or reducing the charge-up. On the other hand, in the case where no charge-up has occurred in the ion optical element, no change should occur in the ion intensity even if the polarity of the direct-current voltage applied to the ion optical element is reversed.

As can be seen from FIG. 3, only when the direct-current voltage applied from DC 5, i.e., the fifth power source 35, to the aperture electrode 16 is temporarily changed, the ion intensity has remarkably increased before and after the change. This indicates that charge-up has occurred in the aperture electrode 16 and the charge-up has been eliminated by temporary application of a direct-current voltage having a different polarity from that immediately before the charge-up. Thus, it is understood that from the relationship in the magnitude of the ion intensity between before and after the period of time T2 in which the direct-current voltage has been temporarily changed, it is possible to specify the ion optical element in which the charge-up has occurred, i.e., the contaminant has progressed. However, as A in FIG. 3 shows, there is a case where the ion intensity increases for a very short length of time immediately after the period of time T2, but this is due to the effect of the spatial ion accumulation, and is not related to the charge-up. Therefore, it is preferable to avoid a temporary increase in the ion intensity immediately after the period of time T2 and to determine the presence or absence of the charge-up on the basis of the relationship in the magnitude of the ion intensity between before and after the period of time T2.

Therefore, from the ion intensity data, the charge-up determination unit 52 obtains, for each ion optical element to ne checked, an ion intensity value I1 immediately before the period of time T2 during which the direct-current voltage is changed and an ion intensity value I2 at a time after a predetermined time (e.g., one second) from the end time of the period of time T2, and calculates an intensity ratio P=I2/I1 (Step S9). This predetermined time is a time for avoiding a temporary increase in ion intensity immediately after the period of time T2. Then, the ion intensity ratio P is compared with a predetermined threshold value, and if the ion intensity ratio P exceeds the threshold value, it is inferred that there is charge-up (Step S10). The threshold value for this determination may be determined in advance on the basis of the result of an experimental examination of variation of the ion intensity or the like, and is preferably about 1.5, for example. This determination allows the estimation that there is charge-up in the aperture electrode 16 on the basis of the change in the ion intensity shown in FIG. 3. Of course, a case where charge-up has occurred in not only one ion optical element but also a plurality of ion optical elements.

When the charge-up determination unit 52 gives a charge-up check result, the charge-up check result display processor 61 having received this result creates a display screen showing the point that is estimated to have been contaminated, and displays the display screen on the screen of the display unit 8 (Step S11).

Figure 4:
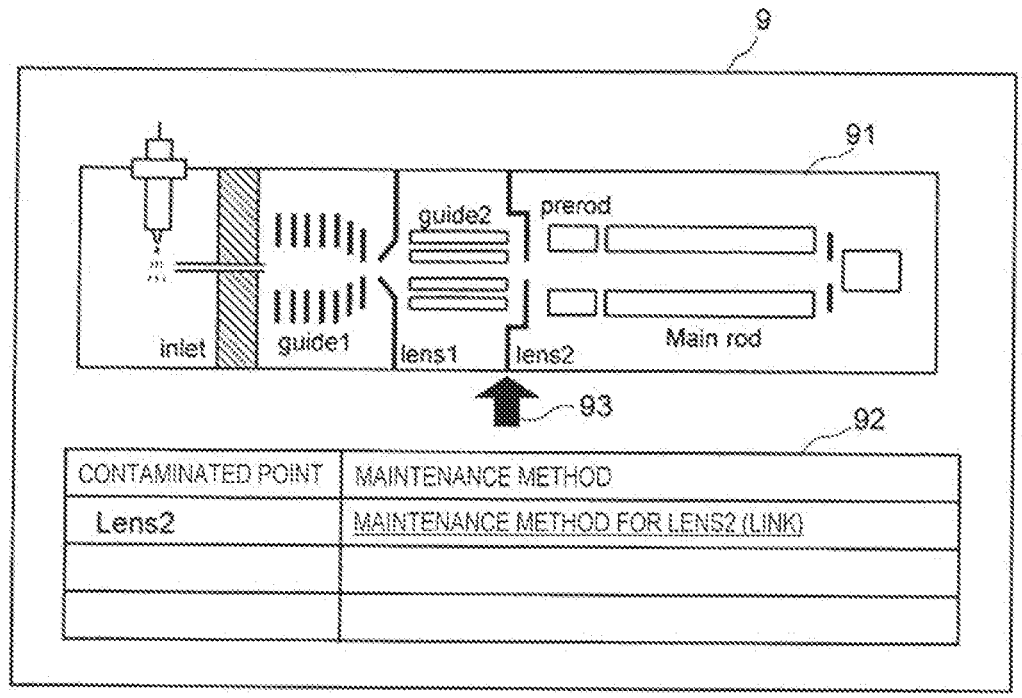
FIG. 4 is a view showing an example of a charge-up determination result display in the quadrupole mass spectrometer of the first embodiment.

FIG. 4 is an example of charge-up check result display. A display screen 9 contains a simulated FIG. 91 simulatively showing the inside of the system body and a check result table 92 showing an estimated contaminated point and its maintenance method arranged side by side. Then, an upward arrow mark 93 written under the simulated FIG. 91 indicates the contaminated point. The "Maintenance Method" in the check result table 92 is a link to a document describing the maintenance method, specifically, an electronic file of an instruction manual installed as a part of the software. Therefore, if the operator looks at the display screen 9 shown in FIG. 4, the operator can immediately grasp that the contaminated point is the aperture electrode 16 ("lens 2" in FIG. 4). By clicking on a display point, "Maintenance Method for Lens 2 (link)" in the check result table 92 with a mouse or the like, a document describing the maintenance method is opened on the screen, and the maintenance can be performed by referring to the document.

As described above, the quadrupole mass spectrometer of the present embodiment makes it possible to automatically and reliably estimate the point where contaminant has progressed and inform the operator of the point, without depending on the experience or skill of the operator. Therefore, the operator only has to take out and clean only a contaminated ion optical element from the casing 1, and this eliminates the need for an unnecessary operation of cleaning of the uncontaminated ion optical element. It is also possible to reduce the occurrence of defects such as damage to the ion optical element or attachment of foreign substances to the ion optical element due to an unnecessary cleaning operation.

In the above description, in steps S9 and S10, the presence or absence of charge-up is determined by comparing, with a threshold value, the intensity ratio between the ion intensity value immediately before the period of time T2 during which the direct-current voltage is changed and the ion intensity value after the end of the period of time T2, but determination can be performed by a different method.

As FIG. 3 indicates, when the charge-up is eliminated by temporarily applying, to the ion optical element, a direct-current voltage having a polarity opposite to that immediately before, the ion intensity returns to the substantially initial level of the beginning of the analysis. Therefore, the presence or absence of charge-up may be determined by calculating the intensity ratio or an intensity difference between the initial ion intensity value at the beginning of analysis and the ion intensity value after the end of the period of time T2 and comparing the calculated intensity ratio or intensity difference with a threshold value. Since the initial ion intensity value at the beginning of analysis is generally reproducible under the same analysis conditions, the ion intensity value actually measured for the same standard sample in a state where no charge-up has occurred may be stored in a memory as a reference, and the presence or absence of charge-up may be determined by calculating the intensity ratio or an intensity difference between the reference value and the ion intensity value after the end of the period of time T2 and comparing the calculated intensity ratio or intensity difference with a threshold value. However, the determination can be made by these determination methods only when any one of the ion optical elements is charged up.

Second Embodiment

A quadrupole mass spectrometer according, to a second embodiment of the present invention is next described with reference to the attached drawings. Since the configuration of the quadrupole mass spectrometer of the second embodiment is the same as that of the quadrupole mass spectrometer of the first embodiment described above, the description of the configuration will be omitted.

Figure 5:
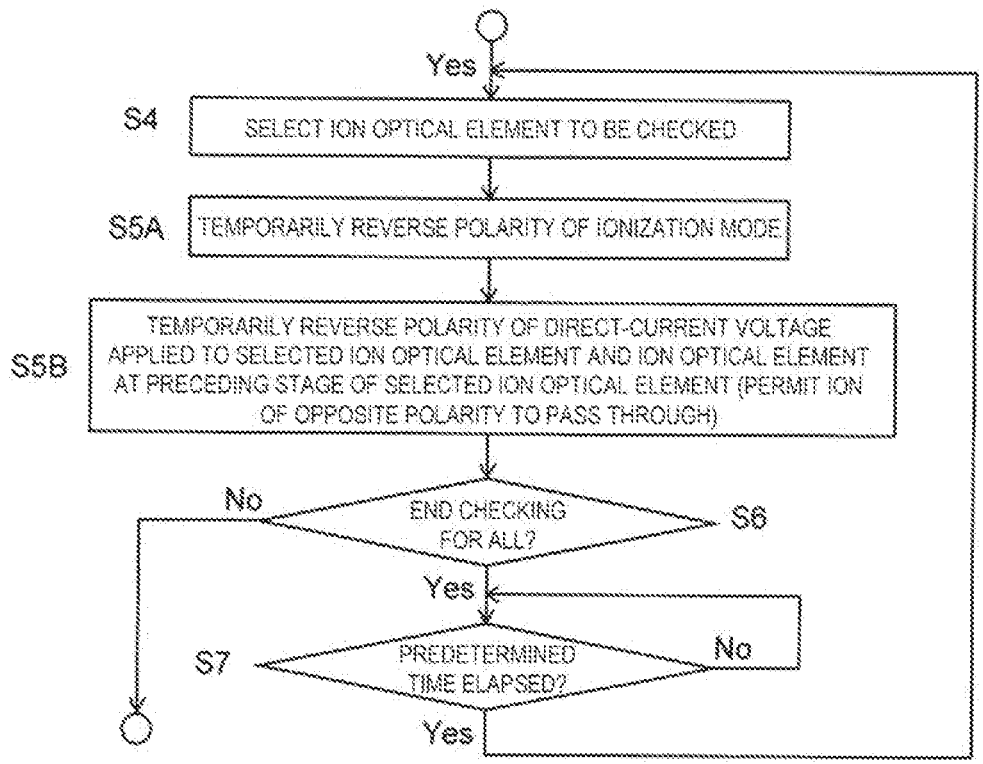
FIG. 5 is a flowchart of a part of charge-up check process in a quadrupole mass spectrometer according to a second embodiment of the present invention.

In the quadrupole mass spectrometer of the first embodiment, the charge-up is eliminated by setting the direct-current voltage applied to the ion optical element to a voltage having a polarity opposite to that immediately before. However, for reasons such as too high degree of contaminant, the charge-up is sometimes not sufficiently eliminated even if a direct-current voltage having an opposite polarity is applied. This method is effective in such cases. FIG. 5 is a flowchart of a part of charge-up check process in the second embodiment. Only the difference from the charge-up check process in the first embodiment shown in FIG. 2 is the process of step S5 in FIG. 2, and hence FIG. 5 shows, in steps S5A and S5B, the process corresponding to the step S5.

Thus, after selecting one ion optical element to be checked (Step S4), the charge-up check controller 41 temporarily reverses the polarity of the ionization mode so that the ions generated by the ESI probe 11 have opposite polarities (Step S5A). Specifically, the charge-up check controller 41 reverses, from positive to negative by a predetermined time, the polarity of the high voltage applied to the electrode disposed at a spray tip for charging the sample liquid. This temporarily causes the positive ionization mode to be switched to the negative ionization mode, and negative ions are generated. The charge-up check controller 41 controls the power sources 31 to 37 so as to reverse, by a predetermined time, the polarity of the direct-current voltage applied to the ion optical element selected in step S4 and all the ion optical elements disposed at the preceding stage of the ion optical element (Step S5B). For example, when the skimmer 14 is selected as the check target, the polarities of the direct-current voltages applied to the three ion optical elements of the heated capillary 12, ion lens 13, and skimmer 14 are reversed.

Since the polarity of the ionization mode is reversed, and the state of the direct-current electric field of the ion passage path from the ion inlet side (i.e., from the heated capillary 12 side) to the selected ion optical element becomes the reversed polarity, the negative ions generated by the ESI probe 11 reach the selected ion optical element. Therefore, when the selected ion optical element is charged up, the charge having charged up is neutralized by the effect of the reached ions. Thus, the charge-up is eliminated more effectively due to, in addition to the charge-dispersing effect due to the application of the direct-current voltage having the opposite polarity to the ion optical element as in the first embodiment, the neutralization effect due to the contact of the ions having the opposite polarity of the accumulated charge. This makes it possible to accurately determine the presence or absence of charge-up even in a state where it is difficult to eliminate the charge-up due to too much contaminant, for example.

In the above embodiment, the intensity of ions having a predetermined mass-to-charge ratio is continuously measured by repeating SIM measurement, but in that case, it is preferable to target low-mass ions susceptible to charge-up. The low-mass ions mentioned here preferably have m/z of less than 1000, more preferably less than 500, and yet more preferably less than 200. Instead of the SIM measurement, the scan measurement may be repeated, and the resulting total ion current value may be used as the ion intensity.

In both the first and second embodiments described above, the present invention is applied in a normal type of quadrupole mass spectrometer. The present invention can also be applied in a tandem quadrupole mass spectrometer having front and rear quadrupole mass filters with a collision cell in between. The present invention can also be applied not only to a quadrupole mass spectrometer or a tandem quadrupole mass spectrometer but also to, for example, a quadrupole-time-of-flight (Q-TOF) mass spectrometer.

Furthermore, it should be noted that any of the previous embodiments is an example of the present invention, and any change, addition or modification appropriately made within the spirit of the present invention in some respects other than those already described will evidently fall within the scope of claims of the present application.

REFERENCE SIGNS UST

1 . . . Casing
101 . . . Ionization Chamber
102 . . . First Intermediate Vacuum Chamber
103 . . . Second Intermediate Vacuum Chamber
104 . . . Analysis Chamber
11 . . . ESI Probe
12 . . . Heated Capillary
13 . . . Ion Lens
14 . . . Skimmer
15 . . . Multipole Ion Guide
16 . . . Aperture Electrode
17 . . . Pre-Quadrupole Mass Filter
18 . . . Main Quadrupole Mass Filter
19 . . . Ion Detector
2 . . . Sample Supply Unit
21 . . . Nitrogen Gas Supply Source
22 . . . Valve
23 . . . Sample Reservoir
31 to 37 . . . Power Source 4 . . . Analysis Controller
41 . . . Charge-Up Check Controller
5 . . . Data Processor
51 . . . Ion Intensity Data Acquisition Unit
52 . . . Charge-Up Determination Unit
6 . . . Controller
61 . . . Charge-Up Check Result Display Processor
7 . . . Input Unit
8 . . . Display Unit
9 . . . Display Screen
91 . . . Simulated Figure
92 . . . Check Result Table
93 . . . Arrow Mark

The invention claimed is:

1. A mass spectrometer including a plurality of ion optical elements configured to transport ions or control a behavior of ions by an effect of an electric field formed by an applied voltage, the mass spectrometer comprising:
   a) a controller configured to perform an analysis operation for a predetermined time for a predetermined sample, and configured to perform, on an operator selected target element, that is one ion optical element to be checked from the plurality of ion optical elements, an operation of eliminating charge-up of temporarily applying a direct-current voltage having a different polarity from a polarity of a direct-current voltage applied to the operator selected target element at a time when the analysis operation is performed;
   b) a contaminant estimation unit configured to estimate a degree of contaminant of the operator selected target element on a basis of a change in ion intensity when the operation of eliminating charge-up is performed; and
   c) a display processor configured to display a contaminant estimation result for the operator selected target element by the contaminant estimation unit.

2. The mass spectrometer according to claim 1, wherein the contaminant estimation unit determines presence or absence of contaminant of the operator selected target element by comparing, with a threshold value, a difference or ratio between ion intensities detected before and after the operation of eliminating charge-up.

3. The mass spectrometer according to claim 1, wherein the contaminant estimation unit determines presence or absence of contaminant the operator selected target element on a basis of an ion intensity detected at an early stage of the analysis operation for the predetermined time and an ion intensity detected after the operation of eliminating charge-up.

4. The mass spectrometer according to claim 1, wherein the contaminant estimation unit determines presence or absence of contaminant of the operator selected target element on a basis of an ion intensity detected after the operation of eliminating charge-up and a previously stored reference value.

* * * * *